United States Patent [19]

Tate

[11] 4,067,501
[45] Jan. 10, 1978

[54] DRIVE MECHANISM FOR AGRICULTURAL IMPLEMENTS

[76] Inventor: Merle D. Tate, Rte. No. 1, Cannon Falls, Minn. 55009

[21] Appl. No.: 618,049

[22] Filed: Sept. 30, 1975

Related U.S. Application Data

[63] Continuation of Ser. No. 561,275, March 24, 1975, abandoned.

[51] Int. Cl.² .............................................. A01C 19/00
[52] U.S. Cl. ...................................... 239/672; 214/82
[58] Field of Search ................... 214/82, 518; 222/334; 239/662, 672, 679

[56] References Cited

U.S. PATENT DOCUMENTS

| | | | |
|---|---|---|---|
| 2,530,350 | 11/1950 | Ehlert | 214/82 |
| 3,682,333 | 8/1973 | Krause | 239/679 X |

Primary Examiner—Robert B. Reeves
Assistant Examiner—John P. Shannon
Attorney, Agent, or Firm—Orrin M. Haugen

[57] ABSTRACT

An improved manure spreader having a rotary beater or distributor at the rear thereof, and having a false end gate for transporting the material to be spread to the rear of the spreader, the false end gate being in the form of a load pushing wall. The false end gate is driven by means of hydraulic cylinders having a stationary portion mounted on the frame of the spreader, with cables being carried by a stabilizer carriage mounted beneath the spreader bed. Two cable systems are provided, one for forward and one for rearward movement of the load pushing false end gate, thus making it possible to controllably move the load toward the rear of the bed, while also providing for rapid return of the load pushing false end gate to the forward end of the spreader.

6 Claims, 7 Drawing Figures

DRIVE MECHANISM FOR AGRICULTURAL IMPLEMENTS

CROSS-REFERENCE TO RELATED APPLICATION

The present application is a continuation of my co-pending application Ser. No. 561,275, filed Mar. 24, 1975, and entitled "DRIVE MECHANISM FOR AGRICULTURAL IMPLEMENTS"now abandoned.

BACKGROUND OF THE INVENTION

The present invention relates generally to an improved unloading device, such as an unloading device from a load retaining vehicle such as a manure spreader or forage box, and being particularly adapted for use in combination with a manure spreader having beater or spreader means disposed at the rear thereof. Means, in the form of a load pushing gate, are provided for transporting the load to the beater means for ultimate spreading, with the gate being movable at a controllably variable rate.

Traditionally, manure spreaders employ a load transport means for delivering the load to the beaters wherein the transport means is essentially in the form of a floating bed or the like. The power for carrying the bed rearwardly is normally provided by a ground engaging wheel, or may, in certain instances, be provided by any alternate power source.

One disadvantage of such typical spreader devices using a load pushing or transporting means operating at a constant rate is that it is difficult to compensate for spreading of both heavy loads and light loads. In other words, as the load depth becomes greater, the load transporting means should reasonably be operated more slowly in order that the material to be spread will be delivered to the beaters at a uniform rate. On the other hand, for light loads, means should be provided to transport the load to the beaters at a relatively rapid rate in order to avoid consumption of both time and energy, while continuing to distribute the load at a relatively even rate.

In the past, efforts have been undertaken to provide false end-gates or other load pushing means for spreader boxes, however these structures have not been totally satisfactory. Frequently, the cables or other devices utilized to controllably move the load transporting means are external of the box and as such present an obstacle to free movement of the structure. Also, these moving cables tend to present a hazard inasmuch as they frequently are permitted to remain unguarded, the hazard continuing to exist due to tensile stresses occurring even in the absence of rapidly moving cable or the like. In certain instances, single or dual hydraulic cylinders have been utilized to directly move a false end-gate or other load pushing means in a spreader box, however variations in loading has caused differential stresses to occur, and thus contribute to a canting of the load pushing means during operation. Also, such cylinder means, when utilized alone, normally requires the utilization of an extremely long box, due to the length requirement of the cylinder and ram when fully retracted. Such length requirements further contribute to improper draw bar loading, thereby rendering it impossible to deliver an appropriate proportion of the load to the tractor draw bar.

A problem frequently encountered with ordinary cable actuated load pushing means is the inability of the pushing means to function while remaining disposed transversely to the axis of the box. Frequently, variations in load depth and densities cause the load transporting means such as a load pushing gate to become canted and otherwise bind during the load pushing or transporting operation. Any twisting of the load transporting gate frequently results in breaking of cables or bending of hydraulic rams which may be utilized to controllably move the cables.

SUMMARY OF THE INVENTION

In accordance with the present invention, however, means are provided for moving the load transporting means at a steady, constant and controllable rate, with a stabilizer carriage means being provided to control the motion of the cables so as to eliminate twisting or canting of the load pushing gate. A single hydraulic or dual cylinders may be utilized to control the motion of the load pushing gate, with this motion being first delivered to the stabilizer carriage means, and from there, through pulley sheaves, to the load pushing gate.

Therefore, it is a primary object of the present invention to provide an improved manure spreader device which is specifically adapted for the handling of variable loads and loads of variable density, the spreader including a movable load transporting means in the form of a load pushing gate, the motion of the gate being controllably variable and dependent upon a stabilizer carriage means mounted beneath the spreader bed.

It is yet a further object of the present invention to provide an improved manure spreader or the like equipped with a controllably movable load pushing gate for transporting the load toward the rear of the box, the load pushing gate being controllably moved at a controllably adjustable rate by hydraulic cylinder means having improved load transporting or load pushing gate moving means.

Other and further objects of the present invention will become apparent to those skilled in the art upon a study of the following specification, appended claims and accompanying drawings.

DESCRIPTION OF THE PREFERRED EMBODIMENT

Figure 1:
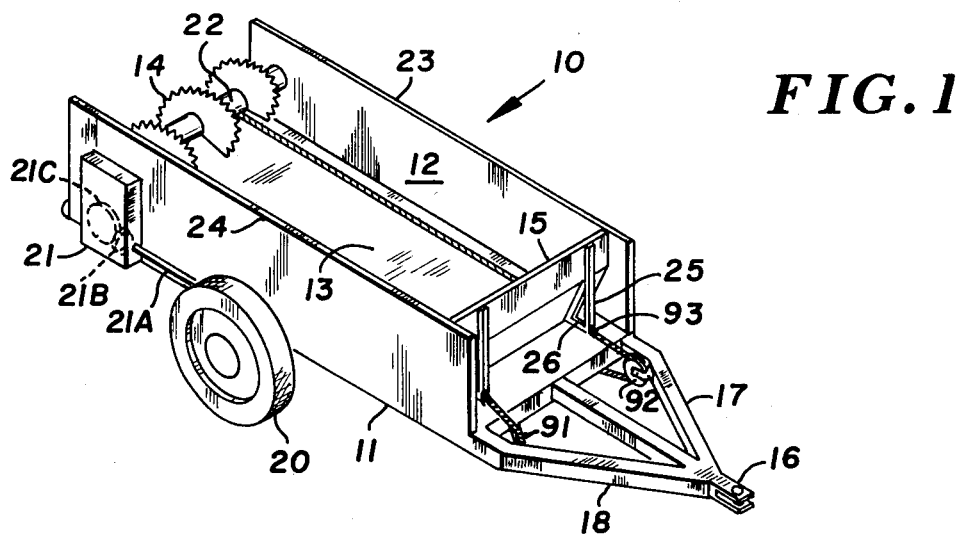
FIG. 1 is a perspective view of the improved manure spreader or load spreading device of the present invention.
Figure 2:
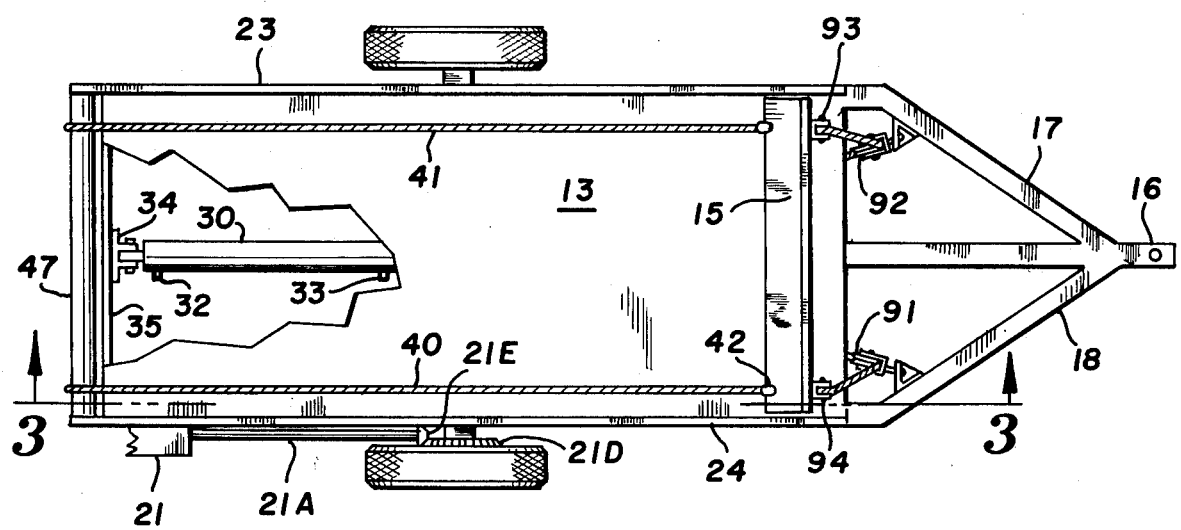
FIG. 2 is a top plan view of the device illustrated in FIG. 1, with a portion of the bed of the box being broken away, and with the beater devices having been removed.

Attention is now directed to FIG. 1 of the drawings wherein the spreader device generally designated 10, such as a manure spreader or the like, comprises frame means 11 with a box arrangement generally designated 12 disposed thereon. A load bearing bed is shown at 13, along with beater means 14 which are operatively disposed at the rear end of the box 12 and bed 13. A load transporting means such as the transverse longitudinally movable load pushing gate 15 is provided and power means are also provided for reciprocatorily moving the load pushing gate 15 along the bed 13 between the forward end thereof, as is the disposition illustrated in FIG. 1, and toward the rear end thereof. Also, in order to provide means for trailing the structure, a tongue 16 is provided having brace elements 17 and 18 disposed on opposite sides of the tongue 16. transport wheel means are shown at 20—20, and a gear box 21 houses the means for rotating the shaft 22 of beater 14. As is conventional in this type of structure, suitable journals are provided in the sides 23 and 24 of the box 12 for accommodating rotation of beater 14. The drive means for delivering rotating motion to shaft 22 includes rotating rod 21A which delivers its motion to a bevel gear or the like as illustrated at 21B. A mating bevel gear 21C is fast on shaft 22 and thus receives the rotating energy from rod or shaft 21A. As is conventional in this type of structure, shaft 21A receives its power from a bevel gear 21D as is illustrated in FIG. 2, with a mating bevel gear 21E being fast on shaft 21A. As an alternate to this type of drive, an endless chain may be utilized with a drive sprocket coupled to wheel 20 delivering rotating energy to a driven sprocket fast on shaft 22. Such drive mechanisms are, of course, conventional for devices of this type, and are also, of course, commercially available.

As has been indicated, load pushing gate 15 is arranged to travel between forward and rearward dispositions, with gate 15 having frame means 25 for supporting the gate during load transporting motion thereof. Frame 25 includes an angular bracket as at 26 for controlling the upright disposition of the gate 15, with the longitudinal disposition being controlled by cable means as will be more fully described hereinafter.

Figure 3:
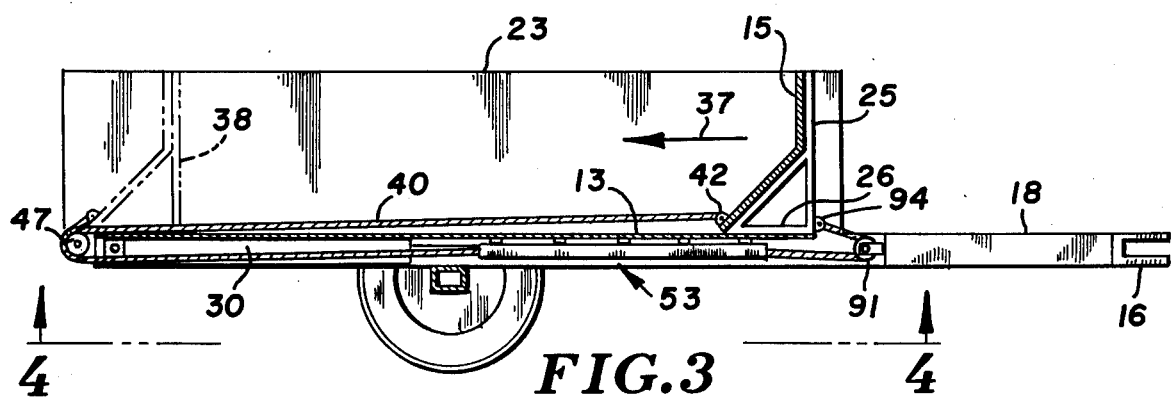
FIG. 3 is a vertical sectional view taken along the line and in the direction of the arrows 3—3 of FIG. 2.

Attention is now directed to FIGS. 2 and 3 of the drawings wherein certain of the means for driving the load pushing gate are illustrated. In FIGS. 2 and 3, hydraulic cylinder 30 is illustrated having a ram 31 extending forwardly therefrom. Means are provided for delivering hydraulic fluid to cylinder 30 through ports 32 and 33 to achieve double-acting motion of ram 31. The main portion of the body of cylinder 30 is coupled to frame means 11 as at 34, wherein the bracket is shown as being secured to the transverse or cross-member 35 of frame means 11.

With continued attention being directed to FIG. 3 of the drawings, it will be observed that the longitudinal motion of load pushing gate 15 is accomplished through typical forward and rearward motion of cables. For purposes of clarity, those cables which function to move the gate rearwardly under substantial power, such as in the direction illustrated by arrow 37 until the phantom disposition illustrated at 38 is reached will be described initially.

Figure 4:
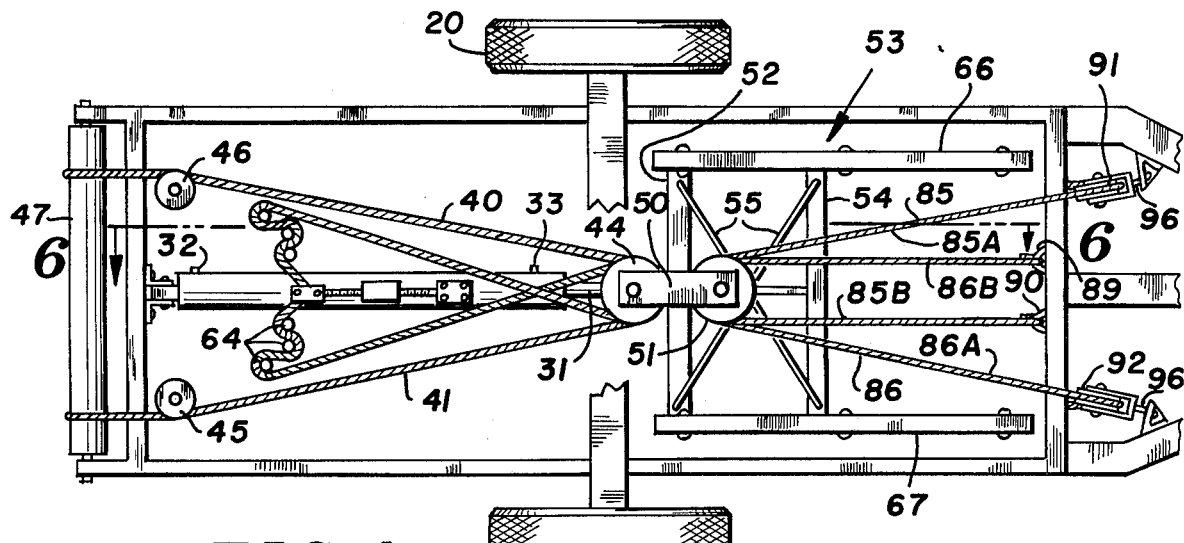
FIG. 4 is a bottom plan view of the load pushing gate articulating mechanism, with a center segment of the axle shaft being broken away for purposes of clarity.

Attention is now directed to FIG. 4 of the drawings wherein the details of the cable articulating mechanism is illustrated. Specifically, cables 40 and 41 are illustrated, with these cables being coupled to the load pushing gate, as is illustrated in FIG. 3, at, for example, 42. As will be described in greater detail hereinafter, it will be observed that cable means 40 and 41 are arranged in a pattern which carries the cable through dual sheave pulley 44, past idler pulleys 45 and 46, over the surface of roller 47, and thence forwardly to the attachment point on load pushing gate 15. In order to control the motion of the dual sheaves of pulley 44, a mounting bracket 50 is provided which carries dual sheave pulley 44, along with a second dual sheave pulley 51 to be described more fully hereinafter, bracket 50 being secured to cross-member 52 of the stabilizer carriage means generally designated 53. Stabilizer carriage 53 includes rigid cross-members 52 and 54, along with an "X"-frame system as at 55. This arrangement provides for stabilized motion of carriage means 53 within the frame or track means provided and described in greater detail in FIG. 7, as will be more fully explained hereinafter.

In connection with the motion of cables 40 and 41, it will be seen that each has first and second spans such as at 40A and 40B, and also at 41A and 41B. These spans are generally parallel, one to another, so as to achieve a greater degree of motion in load pushing gate 15 than is delivered by ram 31 when it is extended from cylinder 30. Each of the cables 40 and 41 is secured to frame 11 in any convenient manner, such as by means of the clamp 60 which is secured, in turn, to the structure of cylinder 30. An adjustment means as illustrated at 61 may be utilized to control the ultimate disposition and length of shaft 62 so as to control the ultimate disposition of the ends of cables 40 and 41 when confined within clamp 60. Ultimate anchoring is achieved through bracket 63. A plurality of snubbers are provided as at 64—64, with these snubbers being arranged to provide a serpentine path for cables 40 and 41, the serpentine path being utilized to reduce the rate at which the individual cables will play-out upon breaking of the cable at the clamping point, such as within the clamp area 60. Thus, in the event of cable breakage while under load, the response in the system will be a continued movement of stabilizer carriage means 53 together with a constant play-out of the cable between the individual snubber members. While the false endgate means will not continue to move, the response of the system will be such that no damage will occur to either the hydraulic cylinder, the load pushing gate 15, or the means supporting and guiding load pushing gate 15.

Figure 5:
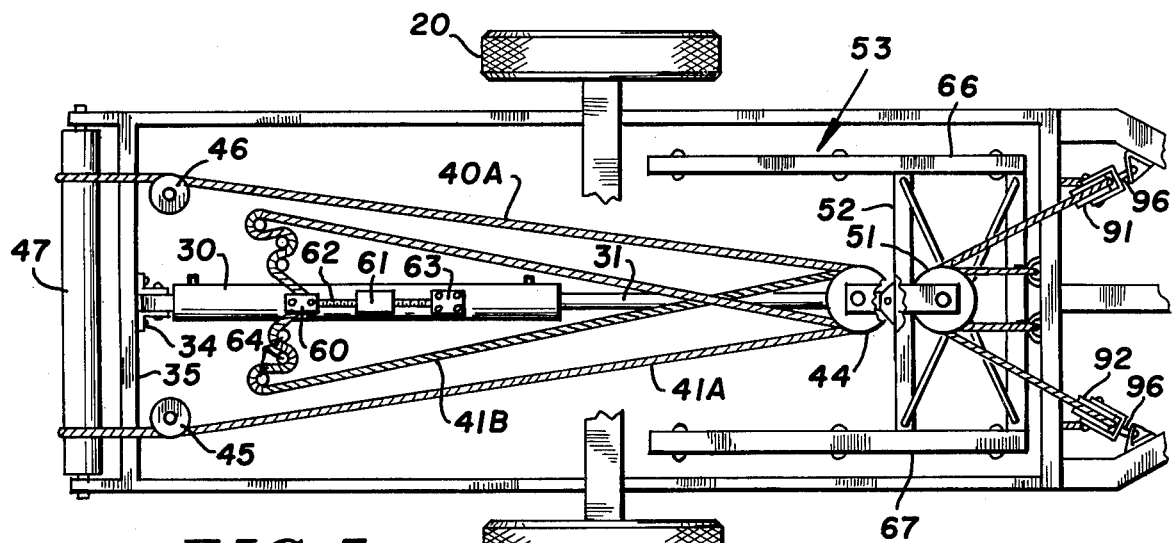
FIG. 5 is a view similar to FIG. 4, and illustrating the structure in a modified disposition, such as the disposition with the load pushing gate at the rear of the box.

With continued attention being directed to FIGS. 4 and 5, it will be seen that in FIG. 4, the stabilizer carriage means 53 is in retracted disposition, and as has been previously indicated, load pushing gate 15 is at its forward disposition. Upon extension of ram 31 from cylinder 30, stabilizer carriage means 53 moves within the lateral frames or guides as at 66 and 67 until the disposition is reached as is illustrated in FIG. 5. Taking this motion and relating the motion to load pushing gate 15, this motion is translated into the carrying of load pushing gate 15 from the forward end of the box to the rearward end thereof, as is illustrated in FIG. 3.

Figure 6:
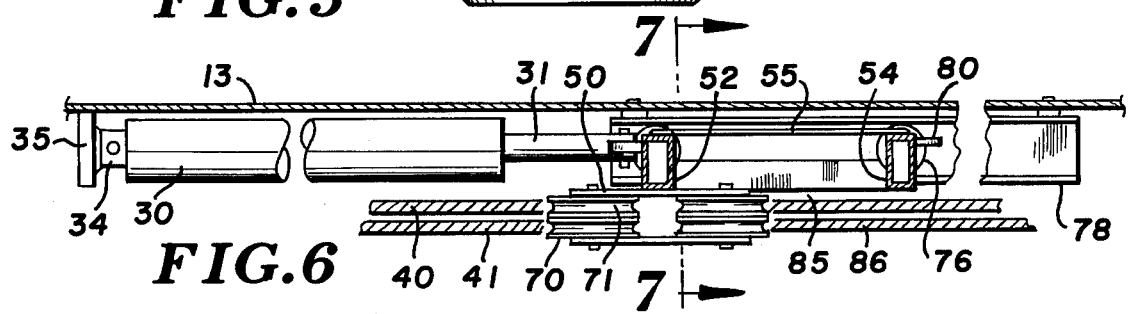
FIG. 6 is a vertical sectional view taken along the line and in the direction of the arrows 6—6 of FIG. 4.
Figure 7:
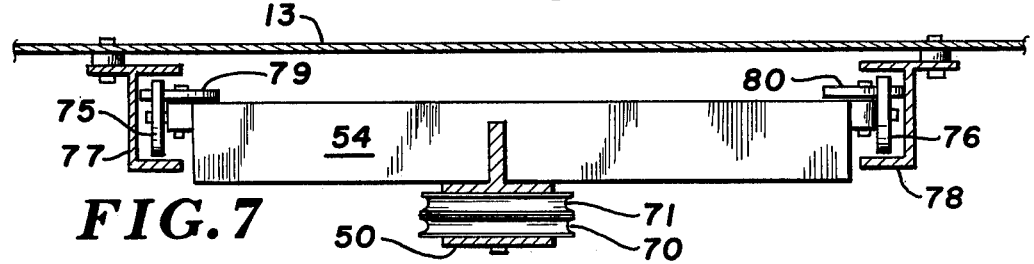
FIG. 7 is a vertical sectional view taken along the line and in the direction of the arrows 7—7 of FIG. 6.

As is illustrated in FIG. 7, and discussed previously, pulley 44 includes dual sheaves, including sheaves 70 and 71. Each of the sheaves carries one of the cables, such as cable 40 or 41, as is illustrated in detail in FIG. 6, for example.

In order to control the motion of carriage 53 within frames or guides 66 and 67, roller means are provided to eliminate the binding of stabilizer carriage means 53 in both horizontal and vertical planes. For control of the vertical plane motion, rollers 75 and 76 are provided, each of which are adapted to be confined for sliding motion within channel members 77 and 78 respectively. Horizontal run-out is controlled by virtue of rollers or discs 79 and 80, as illustrated in FIG. 7. It will be appreciated that carriage 53 is equipped with horizontal and vertical rollers or discs at each end thereof, that is, at each of the four corners so as to eliminate binding or the like which may occur when twisting of stabilizer carriage means 53 within the channels of guides 66 and 67.

Attention is now directed to the second cable means such as cables 85 and 86 which are utilized to retract load pushing gate 15 from the rear of the bed 13 to the forward end thereof. In order to achieve this motion, retraction of ram 31 occurs within cylinder 30, and the dual sheaves of pulley system 51 control the motion of the spans of cables 85 and 86 so as to achieve this result. In this connection, cable 85 has two spans as at 85A and 85B, with cable 86 having a pair of spans as at 86A and 86B. These cables are anchored to the frame by means of clamps 89 and 90. The span of each of cables 85 and 86, such as spans 85A and 86A respectively are passed through idler pulleys 91 and 92 respectively, and ultimately to the back surface of load pushing gate 15, such as is illustrated in FIGS. 1 and 2 at 93 and 94 respectively. In order to accommodate the canting of pulleys 91 and 92, a mounting bracket is provided as at 96—96 for retaining the individual pulleys 91 and 92 on brace members 17 and 18 respectively.

In the retraction operation, ram 31 is retracted into cylinder 30, thereby moving stabilizer carriage means 53 from the disposition illustrated in FIG. 5 to that illustrated in FIG. 4. During this functional motion, cables 85 and 86 through their respective spans carry load pushing gate 15 from the rearward disposition illustrated in FIG. 3 to the forward disposition illustrated in the full lines of FIG. 3.

It will be observed, therefore, that amplification of motion is achieved by virtue of the cable system as attached to the stabilizer carriage means. The arrangement is sufficient to effectively double the motion of the load pushing gate with respect to that of ram 31. Also, the manner in which ram 31 is coupled to stabilizer carriage means 53 renders the operation dependable, straightforward, and reliable. The rate at which hydraulic fluid is introduced into cylinder 30 through either port 32 or 33 will, in turn, determine the rate at which load pushing gate 15 moves along its reciprocatory path. As has been previously indicated, for the distribution of light loads, load pushing gate 15 will be moved rapidly, and this rate will, of course, be slower for heavy loads piled high within box 12. Upon return of gate 15, ram 31 is moved quickly in a retracted mode, with the motion being translated into movement of gate 15 to the forward disposition illustrated in FIG. 1. Obviously, the return motion of gate 15 occurs under only modest loading. In this fashion, therefore, it is possible to utilize either a single ram or dual rams for delivering motion to the stabilizer carriage means. The length of stroke of the hydraulic cylinders and rams is accordingly only one-half of that required to achieve a full stroke of motion for the load pushing gate 15. In the event a dual ram system is employed, the changes necessary are simply to substitute a pair of axially spaced rams for the single ram illustrated herein. Also, if desired, double sheave pulley 51 may be provided in the form of a pair of single pulley sheave members disposed at laterally spaced dispositions along transverse member 52 of stabilizer carriage means 53. For example, a pair of single pulley sheaves may be provided at or about the opposed ends of member 52 if desired. In this connection, however, and in order to provide continuity within the cable system, it is desirable to interconnect the individual cable spans at a central point, and in particular, at a point generally intermediate the pair of snubber systems. Such an arrangement will, therefore, preserve continuity in the systemm and permit controlled play-out of the cable means upon breakage of the cable at any location.

I claim:

1. In combination with a manure spreader having a load supporting frame, a box with a load bearing bed mounted on said frame, a load distributing beater operatively disposed at the rear end of said load bearing bed, a transverse longitudinally movable load pushing gate disposed over said bed, and powered load pushing means for reciprocatorily moving said load pushing gate along said bed between the forward end thereof and the rear end thereof; said power meeans comprising:

a. a hydraulic cylinder with first and second opposed ends and being secured at said first end to said frame and including a ram arranged for reciprocatory powered movement within said hydraulic cylinder;

b. a stabilizer carriage mounted for reciprocatory movement within said frame and beneath said load bearing bed and being coupled operatively to the ram of said hydraulic cylinder;

c. first and second cable assemblies coupled to said load pushing gate and being arranged to move said gate reciprocatorily along said load bearing bed in rearwardly directed load pushing and forwardly directed gate return modes, said first cable assembly including first and second interconnected cable spans, each span having one free end coupled to one lateral end of said load pushing gate and the other ends thereof being interconnected and anchored to said frame between spaced cable snubbers;

d. a first pulley assembly including a pair of sheaves and being secured to said stabilizer carriage and being normally disposed forwardly of said cable snubbers with each of said first and second cable spans passing over one of said sheaves to provide each of said spans with a looped segment with generally parallel span sections of controllably variable length;

e. cable engaging rollers adjacent said load distributing beater and having a surface for carrying said first and second cable spans between said pulley sheaves and said load pushing gate;

f. said second cable assembly including first and second cable spans, with each span of said second cable having an end coupled to one lateral end of said load pushing gate and with the other end coupled to said frame at a certain second anchor point adjacent the forward end of said bed, and having an intermediate segment therebetween, a second pulley assembly with a pair of sheaves secured to said stabilizer carriage and being normally disposed rearwardly of said second anchor point with each of said first and second cable spans of said second cable assembly passing over one of said second pulley sheaves to provide each span of said second cable assembly with a looped segment with generally parallel span sections of controllably variable length.

2. The combination as defined in claim 1 being particularly characterized in that two cable snubbers are provided, one on each side of the interconnection of said first and second cable spans of said first cable assembly.

3. The combination as defined in claim 1 being particularly characterized in that said hydraulic cylinder ram is dual-acting.

4. The combination as defined in claim 1 being particularly characterized in that said stabilizer carriage is mounted within guides disposed beneath said load bearing bed, and wherein said guides provide for controlled motion of said stabilizer carriage in both vertical and horizontal planes.

5. In combination with a load transporting and unloading means having a frame, a box with a load bearing bed mounted on said frame, an unloader assembly operatively disposed at the rear end of said bed, a transverse longitudinally movable load pushing gate disposed over said bed, and power means for reciprocatorily moving said load pushing gate along said bed between the forward end thereof and the rear end thereof, said power means comprising:
   a. a hydraulic cylinder with first and second opposed ends and being secured at said first end to said frame and including a ram arranged for reciprocatory powered movement within said cylinder;
   b. a stabilizer carriage mounted for reciprocatory movement within said frame and beneath said load bearing bed and being coupled operatively to the ram of said hydraulic cylinder;
   c. first and second cable assemblies coupled to said load pushing gate and being arranged to move said gate reciprocatorily along said load bearing bed in rearwardly directed load pushing and forwardly directed gate return modes, said first cable assembly including first and second interconnected cable spans, each span having one free end coupled to one lateral end of said load pushing gate and the other ends thereof being interconnected and anchored to said frame between spaced snubbers;
   d. a first pulley assembly including a pair of sheaves and being secured to said stabilizer carriage means and being normally disposed forwardly of said snubbers with each of said first and second cable spans passing over one of said sheaves to provide each of said spans with a looped segment with generally parallel span sections of controllably variable length;
   e. a cable engaging roller adjacent said unloader assembly and having a surface for carrying said first and second cable spans between said pulley sheaves and said load pushing gate;
   f. said second cable assembly including first and second cable spans, with each spans of said second cable having an end coupled to one lateral end of said load pushing gate and with the other end coupled to said frame adjacent the forward end of said bed, and having an intermediate segment therebetween, a second pulley assembly with a pair of sheaves secured to said stabilizer carriage and being normally disposed rearwardly of said second anchor point with each of said first and second cable spans of said second cable assembly passing over one of said second pulley sheaves to provide each of said second cable assembly spans with a looped segment with generally parallel span sections of controllably variable length.

6. In combination with a manure spreader having a frame, a box with a load bearing bed mounted on said frame, a beater operatively disposed at the rear end of said bed, a transverse longitudinally movable load pushing gate disposed over said bed, and power means for reciprocatorily moving said load pushing gate along said bed between the forward end thereof and the rear end thereof; said power means comprising:
   a. a hydraulic cylinder with first and second opposed ends and being secured at said first end to said frame and including a movable ram arranged for reciprocatory powered movement within said cylinder;
   b. a stabilizer carriage mounted for reciprocatory movement relative to said frame and beneath said load bearing bed and being operatively coupled to the ram of said hydraulic cylinder;
   c. first and second cable assemblies coupled to said load pushing gate and being arranged to move said gate reciprocatorily along said load bearing bed in rearwardly directed load pushing and forwardly directed gate return modes, said first cable assembly including first and second cable spans, each span having one free end coupled to one lateral end of said load pushing gate and the other ends thereof being interconnected to said frame;
   d. a first pulley assembly including a pair of sheaves and being secured to said stabilizer carriage with each of said first and second cable spans passing over one of said sheaves to provide each of said spans with a looped segment with generally parallel span sections of controllably variable length;
   e. a cable engaging roller adjacent said beater and having a surface for carrying said first and second cable spans between said pulley sheaves and said load pushing gate;
   Said second cable assembly including first and second cable spans,
   f. the spans of said second cable assembly each having one end coupled to opposed lateral ends of said load pushing gate and with each other end thereof being coupled to said frame at an anchor point disposed adjacent the forward end of said bed, and each having an intermediate segment therebetween, a second pulley assembly secured to said stabilizer carriage and being normally disposed rearwardly of said anchor point with the spans of said second cable assembly passing over said second pulley assembly to provide said second cable assembly with a looped segment with generally parallel span sections of controllably variable length.

* * * * *